(12) United States Patent
Silverman et al.

(10) Patent No.: US 10,965,349 B2
(45) Date of Patent: Mar. 30, 2021

(54) RELIABILITY BY SWITCHING BETWEEN ANTENNA STATES

(71) Applicant: Cisco Technology, Inc., San Jose, CA (US)

(72) Inventors: Matthew Aaron Silverman, Shaker Heights, OH (US); Fred J. Anderson, Lakeville, OH (US); Ardalan Alizadeh, San Jose, CA (US); Huaiyi Wang, North Royalton, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/559,356

(22) Filed: Sep. 3, 2019

(65) Prior Publication Data

US 2021/0067210 A1    Mar. 4, 2021

(51) Int. Cl.
*H04B 7/0417*   (2017.01)
*H04B 7/06*     (2006.01)
*H04L 5/00*     (2006.01)

(52) U.S. Cl.
CPC ......... *H04B 7/0417* (2013.01); *H04B 7/0626* (2013.01); *H04B 7/0691* (2013.01); *H04L 5/0051* (2013.01); *H04L 5/0057* (2013.01)

(58) Field of Classification Search
CPC .................................................. H04B 7/0417
USPC ........................................................ 375/267
See application file for complete search history.

(56) References Cited

U.S. PATENT DOCUMENTS

| 8,774,110 | B2 | 7/2014 | Oyman |
| 9,572,130 | B2 | 2/2017 | Ioffe |
| 2007/0104164 | A1* | 5/2007 | Laroia ................... H04B 17/345 370/338 |
| 2011/0249576 | A1 | 10/2011 | Chrisikos |
| 2011/0249760 | A1* | 10/2011 | Chrisikos ............... H01Q 1/243 375/259 |

(Continued)

FOREIGN PATENT DOCUMENTS

WO    WO 2018172136 A1    9/2018

OTHER PUBLICATIONS

Basar, et al., Media-Based Modulation for Future Wireless Systems: A Tutorial, arXiv:1811.08730v1, 11 pages, Nov. 28, 2018.

*Primary Examiner* — Lihong Yu
(74) *Attorney, Agent, or Firm* — Baker Botts, LLP

(57) ABSTRACT

In one embodiment, a method includes identifying a number of configured proactive repetitions in downlink transmissions from the base station, selecting k antenna states for receiving repetitive downlink transmissions among the number of antenna states, where k equals the number of configured proactive repetitions, and where each of the k antenna states corresponds to each of the repetitive downlink transmissions, transmitting a CSI report for each of the k antenna states to the base station, where a CSI report for an antenna state is used by the base station to adjust configurations for the corresponding downlink transmission, receiving signals for each of the k repetitive downlink transmissions from the base station using each of the k antenna states, and decoding the downlink transmission based on k sets of received signals, each of the k sets being received using each of the k selected antenna states.

20 Claims, 6 Drawing Sheets

(56) References Cited

U.S. PATENT DOCUMENTS

| | | | |
|---|---|---|---|
| 2012/0039322 A1* | 2/2012 | Tee | H04W 72/0406 370/338 |
| 2015/0117287 A1* | 4/2015 | Kim | H04W 4/18 370/311 |
| 2016/0072572 A1* | 3/2016 | Kang | H04B 7/0417 370/329 |
| 2016/0112998 A1* | 4/2016 | Jongren | H04L 5/0048 370/329 |
| 2020/0145061 A1* | 5/2020 | Black | H04B 7/024 |

* cited by examiner

RELIABILITY BY SWITCHING BETWEEN ANTENNA STATES

TECHNICAL FIELD

The present disclosure relates generally to a field of wireless data communications, and more particularly, to increasing spatial diversity by switching between a plurality of antenna states for receiving and transmitting proactive repetitions.

BACKGROUND

With advances of wireless communication technologies, services and applications that require stringent latency and reliability are drawing attention. The 3rd Generation Partnership Project (3GPP) has introduced Ultra-Reliable and Low-Latency Communications (URLLC) as a new service category in 5th Generation (5G) cellular networks to accommodate such requirements. 5G URLLC imposes challenging goals for the Radio Access Network (RAN) in terms of the required packet loss performance and user plane latency. The general URLLC reliability requirement for one transmission of a 32-byte layer-2 protocol data unit is a minimum error rate of 10-5 with a maximum allowed user plane latency of 1 ms. Proactive repetition may be a standard transmission mechanism for URLLC, in which a data unit may be proactively transmitted k times. Proactive repetition may sacrifice latency to a certain degree for better packet loss performance. Significant improvement to system throughput and packet loss performance comes with higher Multiple-Input and Multiple-Output (MIMO) order. However, due to a limitation of power consumption, available silicon area, processing capability, or even system budget, many User Equipment (UE) devices may not have sufficient number of Radio Frequency (RF) chains to support the high MIMO order required to take full advantage of the potential reliability improvement.

DESCRIPTION OF EXAMPLE EMBODIMENTS

Overview

Figure 1:
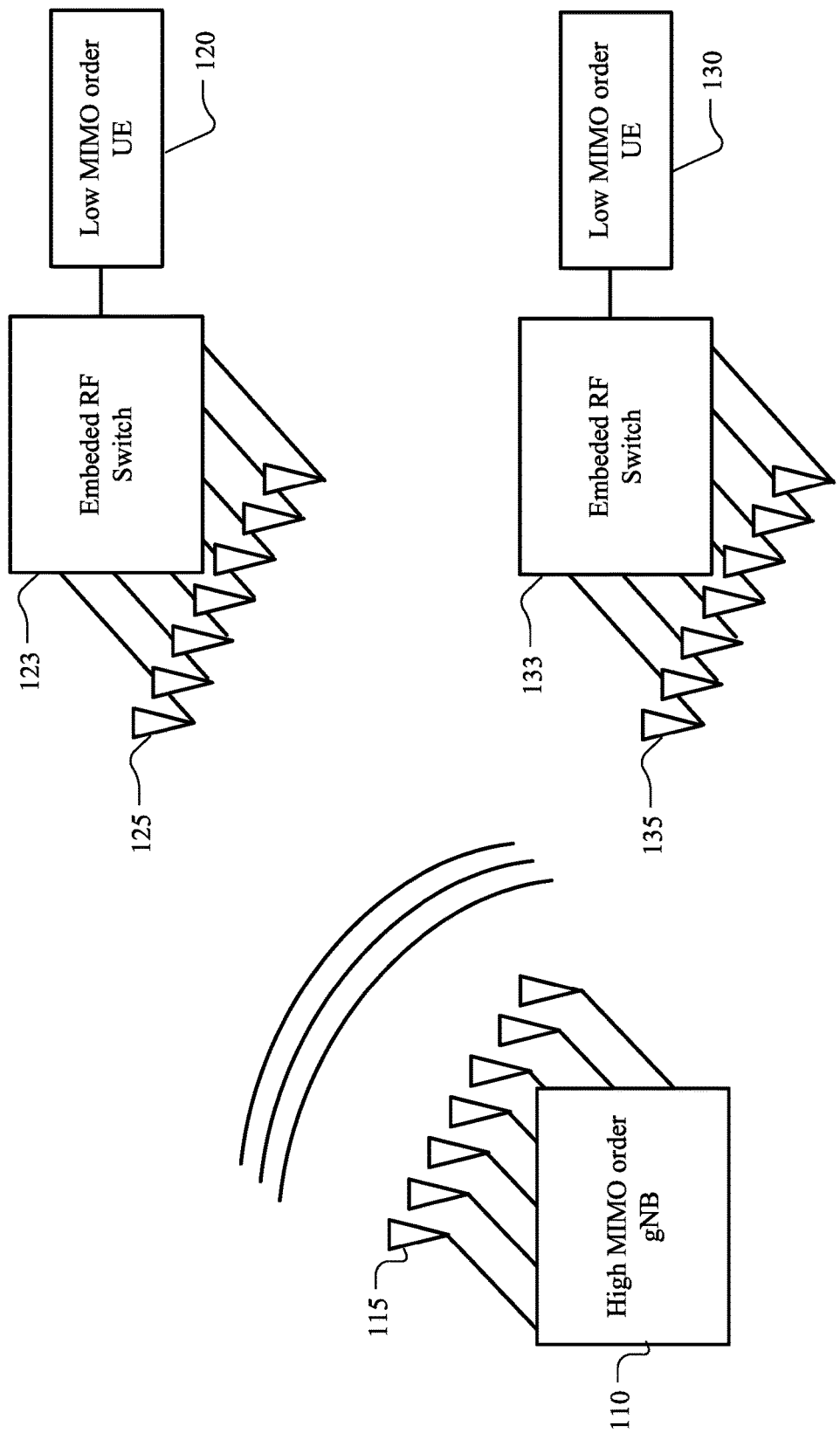
FIG. 1 illustrates an example MIMO-enabled wireless cellular network.

In particular embodiments, a wireless apparatus may establish an association with a base station. The wireless apparatus may identify a number of configured proactive repetitions in downlink transmissions from the base station. The wireless apparatus may receive a downlink transmission in one of a plurality of antenna states. The number of configured proactive repetitions in downlink transmissions may be k. The wireless apparatus may select k antenna states for receiving repetitive downlink transmissions among the plurality of antenna states. Each of the k antenna states may correspond to each of the repetitive downlink transmissions. The wireless apparatus may transmit a CSI report for each of the k antenna states to the base station. A CSI report for an antenna state may be used by the base station to adjust configurations for the corresponding downlink transmission. The wireless apparatus may receive signals for each of the k repetitive downlink transmissions from the base station using a corresponding antenna state. A schedule for the downlink transmission is determined by the base station. The wireless apparatus may decode the downlink transmission based on k sets of received signals. Each of the k sets may be received using each of the k selected antenna states.

Example Embodiments

In radio technologies, MIMO is a method for multiplying the capacity of a radio link using multiple transmission and receiving antennas to exploit multipath propagation. Previously, the term 'MIMO' referred to the use of multiple antennas at the transmitter and the receiver. In modern usage, 'MIMO' specifically refers to a practical technique for sending and receiving more than one data signal simultaneously over the same radio channel by exploiting multipath propagation. MIMO may be sub-divided into three main categories: precoding, spatial multiplexing, and diversity coding. Precoding may be considered to be all spatial processing that occurs at the transmitter. In (single-stream) beamforming, the same signal may be emitted from each of the transmit antennas with appropriate phase and gain weighting such that the signal power is maximized at the receiver input. The benefits of beamforming may be to increase the received signal gain, by making signals emitted from different antennas add up constructively, and to reduce the multipath fading effect. In line-of-sight propagation, beamforming may result in a well-defined directional pattern. However, conventional beams may not be a good analogy in cellular networks, which are mainly characterized by multipath propagation. When the receiver has multiple antennas, the transmit beamforming cannot simultaneously maximize the signal level at all of the receive antennas, and precoding with multiple streams may often be beneficial. Precoding may require knowledge of CSI at the transmitter and the receiver.

Spatial multiplexing may require MIMO antenna configuration. In spatial multiplexing, a high-rate signal may be split into multiple lower-rate streams and each stream is transmitted from a different transmit antenna in the same frequency channel. If these signals arrive at the receiver antenna array with sufficiently different spatial signatures and the receiver has accurate CSI, the receiver can separate these streams into parallel channels. Spatial multiplexing may be a powerful technique for increasing channel capacity at higher signal-to-noise ratios (SNR). The maximum number of spatial streams may be limited by the lesser of the number of antennas at the transmitter or receiver. Spatial multiplexing may be used without CSI at the transmitter. But, spatial multiplexing may be combined with precoding if CSI is available. Diversity coding techniques may be used when there is no channel knowledge at the transmitter. With diversity coding, a single stream may be transmitted, but the signal may be coded using techniques called space-time coding. The signal may be emitted from each of the transmit antennas with full or near orthogonal coding. Diversity coding exploits the independent fading in the multiple antenna links to enhance signal diversity. Because no channel knowledge is available, no beamforming or array gain may result from diversity coding. Diversity coding can be combined with spatial multiplexing when some channel knowledge is available at the transmitter.

FIG. 1 illustrates an example MIMO-enabled wireless cellular network. A base station 110 may be equipped with an array of antennas 115. The base station 110 may be a next generation NobeB (gNB) in a fifth generation (5G) cellular network. The base station 110 may transmit downlink signals using the array of antennas 115. The network 100 may comprise a plurality of user equipment (UEs) associated with the base station 110. FIG. 1 illustrates two UEs 120 and 130. Though UE 120 may be equipped with an array of antennas 125, due to various limitations, the UE 120 may not have enough RF chains. The UE 120 may have an embedded RF switch 123 that may switch among a plurality of possible antenna states. An antenna state may specify a subset of antennas connected to RF chains among the array of antennas. UE 130 may also be equipped with an array of antennas 135. The UE 130 may have an embedded RF switch 133.

In particular embodiments, the base station 110 may be configured to make k proactive repetitive transmissions for a downlink data unit. The number of configured proactive repetitions may be communicated by the base station. As an example and not by way of limitation, illustrated in FIG. 1, URLLC may be enabled at a gNB 110 to support applications requiring high-reliability and low-latency. The applications may include, but are not limited to, Virtual Reality (VR)/Augmented Reality (artificial-reality), self-driving cars, factory automation, and any other suitable application. For example, self-driving cars may communicate with each other to coordinate between themselves. Low-latency and high-reliability would be critically required for those communications. The gNB 110 may need to ensure that downlink data is successfully delivered to the destination UE with a latency less than a pre-determined threshold. A single downlink transmission is associated with an expected error probability. Multiple (repetitive) transmissions may reduce the expected error probability significantly. Retransmitting the downlink data upon receiving feedback from the destination UE may cause potential delays especially when more than one transmission has not been successfully delivered. The gNB 110 is configured to make k proactive repetitions without receiving feedback from the destination UE to achieve high-reliability with low-latency. The gNB 110 may be configured to communicate the number of proactive repetitions with UEs. In particular embodiments, the gNB 110 may communicate the number of proactive repetitions in a Downlink Control Information (DCI) block. In particular embodiments, the gNB 110 may broadcast the number of proactive repetitions as a systemwide configuration. Although this disclosure describes configuring a gNB to achieve high-reliability and low-latency in a particular manner, this disclosure contemplates configuring a gNB to achieve high-reliability and low-latency in any suitable manner.

In particular embodiments, a wireless apparatus 120 associated with the base station 110 may identify a number of configured proactive repetitions in downlink transmissions from the base station. The wireless apparatus 120 may be associated with an array of antennas 125. An antenna state may specify a subset of antennas connected to RF chains among the array of the antennas. The wireless apparatus may be configured to receive a downlink transmission in one of a plurality of antenna states available to the wireless apparatus 120. As an example and not by way of limitation, continuing with a prior example, illustrated in FIG. 1, the UE 120 may be equipped with an array of antennas 125. However, due to a limitation of power consumption, available silicon area, processing capability, or even system budget, the UE 120 may not have enough number of RF chains to support the high MIMO order. Instead, an embedded RF switch 123 may be associated with the UE 120. The embedded RF switch 123 may switch between antenna states where an antenna state may specify a subset of antennas connected to RF chains among the array of the antennas 125. The UE 120 may identify the number of configured proactive repetitions in downlink transmissions from the gNB 110 based on the information received from the gNB 110. Although this disclosure describes identifying the number of configured proactive repetitions in a particular manner, this disclosure contemplates identifying the number of configured proactive repetitions in any suitable manner.

In particular embodiments, the number of configured proactive repetitions may be equal to k. The wireless apparatus 120 may select k antenna states for receiving repetitive downlink transmissions among the plurality of antenna states. Each of the k antenna states may correspond to each of the k repetitive downlink transmissions. Though only limited MIMO order operations are supported by the wireless apparatus 120, the wireless apparatus 120 may improve the link reliability by switching between antenna states while receiving k repetitive downlink transmissions. As an example and not by way of limitation, continuing with a prior example, UE 120 may identify that the number of proactive repetitions in downlink transmissions, k, is 4. The UE 120 may select four antenna states among the plurality of available antenna states. In particular embodiments, the UE 120 may re-select k antenna states at an interval. Although this disclosure describes selecting a subset of antenna states among a plurality of available antenna states in a particular manner, this disclosure contemplates selecting a subset of antenna states among a plurality of available antenna states in any suitable manner.

In particular embodiments, the base station 110 may be configured to transmit reference signals. The base station 110 may transmit a plurality of types of reference signals. The plurality of types of reference signals may comprise Channel State Information Reference Signal (CSI-RS). Receiving a CSI-RS from the base station 110, the wireless apparatus 120 may estimate the channel based on the received CSI-RS and report CSI back to the base station 110. A CSI-RS may be configured specific to the wireless apparatus 120. In particular embodiments, the wireless apparatus 120 may generate a CSI report for an antenna state based on observed parameters while receiving a reference signal with the antenna state. The wireless apparatus 120 may transmit the CSI report for each of the k antenna states to the base station. A CSI report for an antenna state may be used by the base station 110 to adjust configurations for the corresponding downlink transmission. As an example and not by way of limitation, continuing with a prior example, the UE 120 may generate a CSI report for each of the four selected antenna states. The UE 120 may send the generated CSI report to the gNB 110 at transmission opportunities communicated by the gNB 110. The gNB 110 may adjust configurations, e.g., precoding, spatial multiplexing, etc., for each of the four proactive repetitions. Each of the four proactive repetitions may be received by the UE 120 using the corresponding antenna state. Although this disclosure describes sending a CSI report per antenna state in a particular manner, this disclosure contemplates sending a CSI report per antenna state in any suitable manner.

Figure 2:
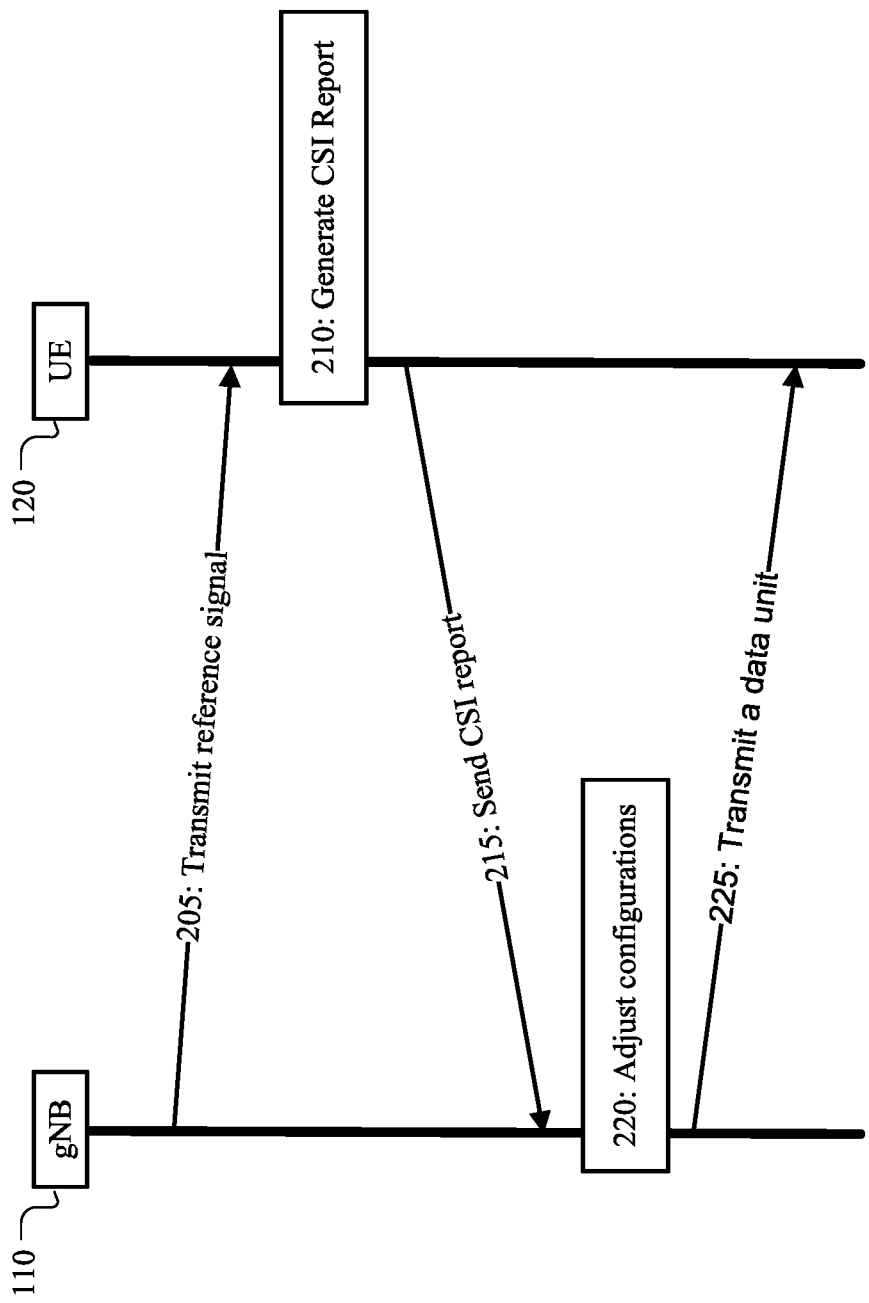
FIG. 2 illustrates an example message sequence for adjusting transmission radio parameters based on a Channel State Information (CSI) report.

FIG. 2 illustrates an example message sequence for adjusting transmission radio parameters based on a CSI report. The gNB 110 may, at step 205, transmit a CSI-RS to the UE 120. On receiving the CSI-RS using an antenna state i, the UE may, at step 210, generate a CSI report for the antenna state i by estimating the channel based on the received CSI-RS. At step 215, the UE may send the CSI report to the gNB 110. At step 220, the gNB may adjust configurations for a transmission based on the received CSI such that the transmission is optimized for the antenna state i at the UE 120. At step 225, the gNB may transmit i-th transmission out of the k proactive repetitions for a data unit using the adjusted configurations. The UE 110 may receive the transmission using the antenna state i. Although this disclosure describes receiving a downlink transmission using an antenna state that was used for generating a CSI report in a particular manner, this disclosure contemplates receiving a downlink transmission using an antenna state that was used for generating a CSI report in any suitable manner.

In particular embodiments, the UE 120 may select k antenna states among the plurality of available antenna states that are associated with one or more scores indicating channel quality for receiving a reference signal higher than the other antenna states at a time of the selection. The UE 120 may re-select the antennas states at a regular interval to make sure that the selected antenna states are associated with one or more scores indicating channel quality higher than the other antenna states. As an example and not by way of limitation, continuing with a prior example, the UE 120 may receive reference signals using all the available antenna states. For each antenna state, the UE 120 may compute one or more indicators that may indicate the channel quality. The one or more indicators may comprise Reference Signal Received Power (RSRP), Reference Signal Received Quality (RSRQ), or any other suitable indicators. The UE 120 may select k antenna states with highest computed indicators. Although this disclosure describes selecting antenna states experiencing better channel quality than the other antenna states in a particular manner, this disclosure contemplates selecting antenna states experiencing better channel quality than the other antenna states in any suitable manner.

In particular embodiments, the UE 120 may select k antenna states in a round robin manner among the plurality of antenna states. By doing this, all the available antenna states may be utilized. As an example and not by way of limitation, continuing with a prior example, the UE 120 may select k antenna states in a round robin manner for a set of proactive repetitions in downlink transmissions. For a next set of proactive repetitions, the UE 120 may select the next k antenna states in a round robin manner. In particular embodiments, the UE 120 may select k antenna states in any suitable manner. As another example and not by way of limitation, the UE 120 may randomly select k antenna states. Although this disclosure describes selecting k antenna states in a round robin manner in a particular manner, this disclosure contemplates selecting k antenna states in a round robin manner in any suitable manner.

In particular embodiments, the UE 120 may receive signals for i-th repetition among the k proactive repetitive downlink transmissions from the base station using the i-th antenna state among the k selected antenna states. The CSI report for the i-th antenna state has been provided to the base station 110 at a provided uplink transmission opportunity by the base station 110. A schedule for the downlink transmission may be determined by the base station 110. Although this disclosure describes receiving i-th repetition using the i-th antenna state for which the CSI report was provided to the base station in a particular manner, this disclosure contemplates receiving i-th repetition using the i-th antenna state for which the CSI report was provided to the base station in any suitable manner.

Figure 3:
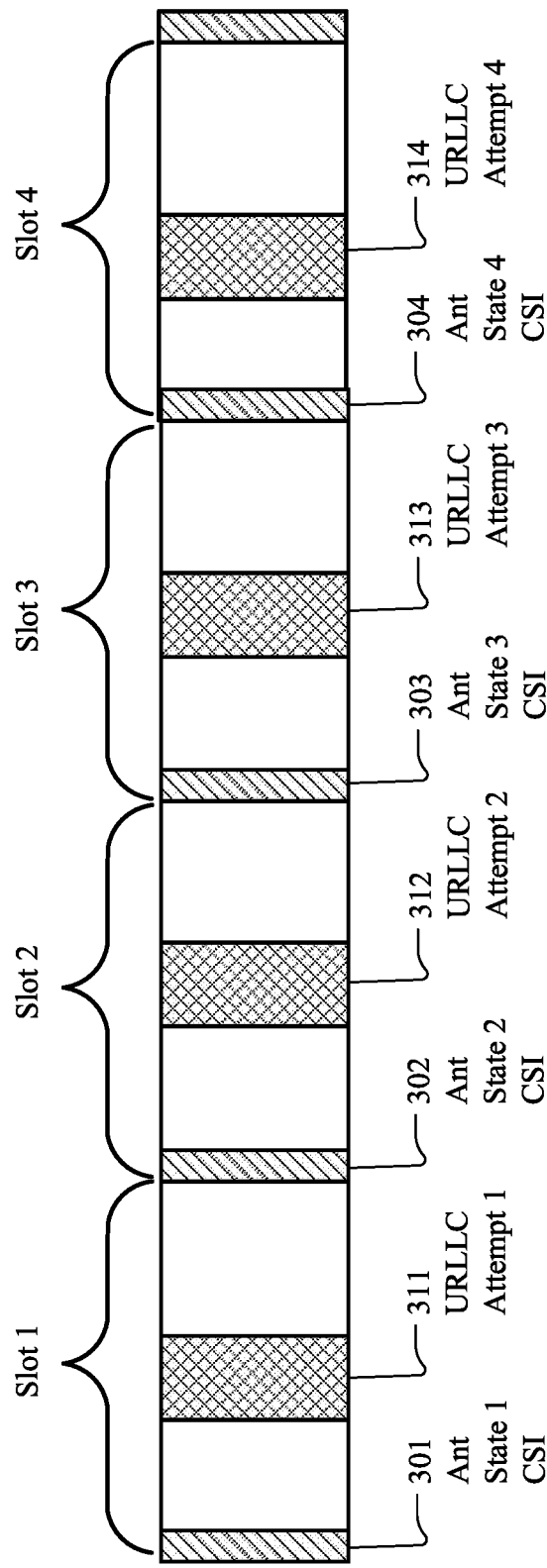
FIG. 3 illustrates example proactive repetitions under a semi-persistent scheduling.

In particular embodiments, the base station 110 may schedule an uplink transmission opportunity for a CSI report and a downlink transmission for the respective proactive repetition in a semi-persistent manner. In a semi-persistent schedule, a transmission schedule may reoccur at a pre-determined interval until the schedule is explicitly cancelled by the base station 110. After a semi-persistent schedule becomes effective, no explicit signaling for scheduling may be needed. FIG. 3 illustrates example proactive repetitions under a semi-persistent scheduling. As an example and not by way of limitation, illustrated in FIG. 3, the number of proactive repetitions may be configured at four. The gNB 110 may have signaled a semi-persistent scheduling for the proactive repetitions, where the UE 120 may be configured to send a CSI report at the beginning of each slot. Also downlink resources may have been allocated for a proactive repetition in each slot. At the beginning of slot 1, at the provided uplink transmission opportunity for a CSI report, the UE 120 may send a CSI report 301 for antenna state 1. The CSI report 301 may have been generated based on a received reference signal in the previous slot. The gNB 110 may adjust configurations for a downlink transmission based on the received CSI report 301 from the UE 120. The gNB 110 may transmit the $1^{st}$ downlink transmission 311 in the middle of slot 1, which is semi-persistently scheduled. The UE may receive the $1^{st}$ downlink transmission 311 using the antenna state 1. At the beginning of slot 2, at the provided uplink transmission opportunity for a CSI report, the UE 120 may send a CSI report 302 for antenna state 2. The CSI report 302 may have been generated based on a received reference signal in slot 1. The gNB 110 may adjust configurations for a downlink transmission based on the received CSI report 302 from the UE 120. The gNB 110 may transmit the $2^{nd}$ downlink transmission 312 in the middle of slot 2, which is semi-persistently scheduled. The UE may receive the $2^{nd}$ downlink transmission 312 using the antenna state 2. At the beginning of slot 3, at the provided uplink transmission opportunity for a CSI report, the UE 120 may send a CSI report 303 for antenna state 3. The CSI report 303 may have been generated based on a received reference signal in slot 2. The gNB 110 may adjust configurations for a downlink transmission based on the received CSI report 303 from the UE 120. The gNB 110 may transmit the $3^{rd}$ downlink transmission 313 in the middle of slot 3, which is semi-persistently scheduled. The UE may receive the $3^{rd}$ downlink transmission 313 using the antenna state 3. At the beginning of slot 4, at the provided uplink transmission opportunity for a CSI report, the UE 120 may send a CSI report 304 for antenna state 4. The CSI report 304 may have been generated based on a received reference signal in slot 3. The gNB 110 may adjust configurations for a downlink transmission based on the received CSI report 304 from the UE 120. The gNB 110 may transmit the $4^{th}$ downlink transmission 314 in the middle of slot 4, which is semi-persistently scheduled. The UE may receive the $4^{th}$ downlink transmission 314 using the antenna state 4. The gNB 110 and the UE 120 may not need to communicate for the scheduling until the semi-persistent scheduling is cancelled. Although this disclosure describes sending CSI reports and receiving downlink repetitive transmissions with a semi-persistent scheduling in a particular manner, this disclosure contemplates sending CSI reports and receiving downlink repetitive transmissions with a semi-persistent scheduling in any suitable manner.

Figure 4:
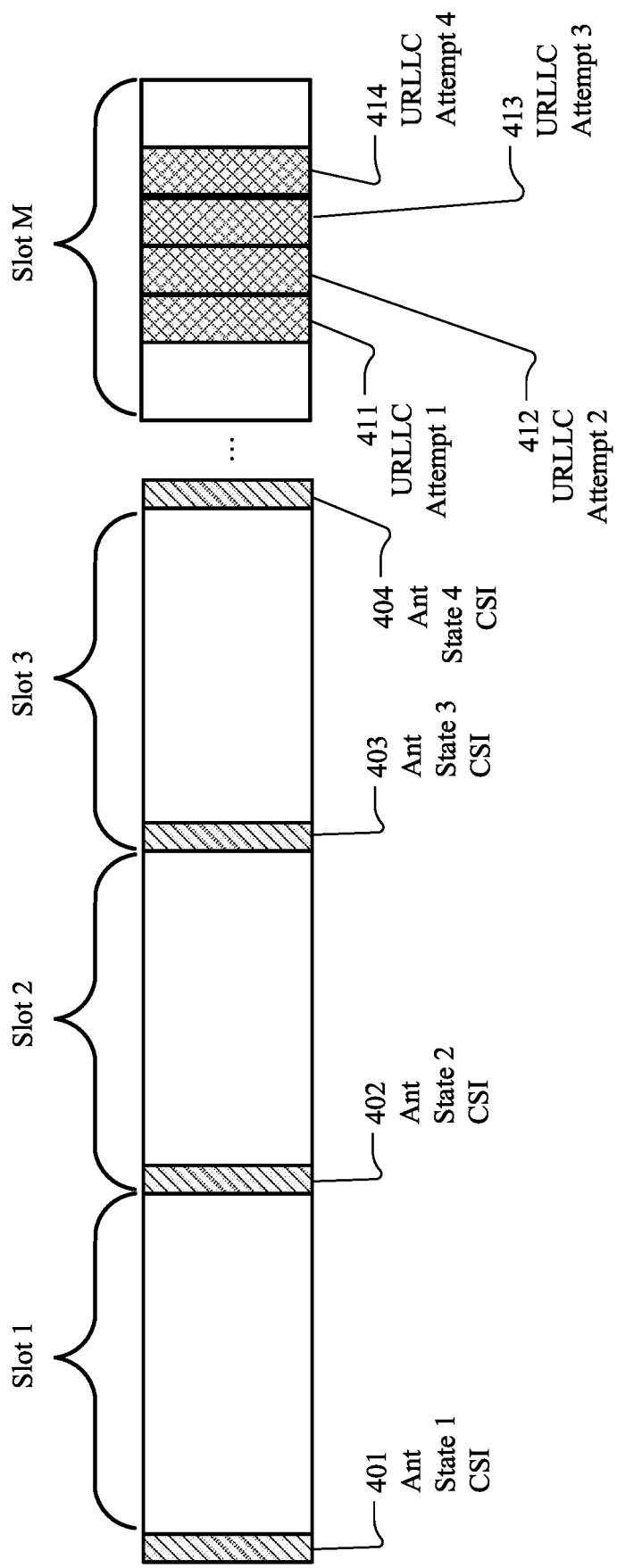
FIG. 4 illustrates example proactive repetitions under a dynamic scheduling.

In particular embodiments, the base station 110 may schedule uplink transmission opportunities for CSI reports and repetitive downlink transmissions in a dynamic manner. In the dynamic scheduling, the base station 110 may communicate with the wireless apparatus 120 regarding the determined schedules. FIG. 4 illustrates example proactive repetitions under a dynamic scheduling. As an example and not by way of limitation, illustrated in FIG. 4, the gNB 110 may determine uplink transmission opportunities for the CSI reports and downlink transmission opportunities for proactive downlink repetitions. The gNB 110 may communicate with the UE 120 regarding the determined uplink and downlink transmission opportunities. In particular embodiments, the gNB 110 may communicate with the UE 120 once for each opportunity. In particular embodiments, the gNB 110 may communicate with the UE 120 once for a set of proactive repetitions for a downlink data unit. In particular embodiments, the gNB 110 may communicate with the UE 120 regarding the uplink and downlink transmission opportunities in any suitable manner including combining with the other signals. The UE 120 may send CSI reports 401, 402, 403, and 404 for antenna states 1, 2, 3, and 4. Though FIG. 4 illustrates that the CSI reports are transmitted one at a slot, the UE 120 may send the CSI reports at any suitable uplink transmission opportunities provided by the gNB 110. Based on the CSI reports 401, 402, 403, and 404 the gNB 110 may adjust configurations for each downlink repetitive transmissions for the data unit. The gNB 110 may transmit downlink repetitive transmissions 411, 412, 413, and 414 at the pre-determined corresponding downlink transmission opportunities. The UE 120 may use antenna state 1 for receiving the first downlink repetition 411. The UE 120 may use antenna state 2 for receiving the second downlink repetition 412. The UE 120 may use antenna state 3 for receiving the third downlink repetition 411. The UE 120 may use antenna state 4 for receiving the fourth downlink repetition 414. Though FIG. 4 illustrates that the four downlink transmissions occur in a slot, the gNB 110 may transmit the downlink repetitions at any suitable pre-determined schedule. Although this disclosure describes sending CSI reports and receiving downlink repetitive transmissions with a dynamic scheduling in a particular manner, this disclosure contemplates sending CSI reports and receiving downlink repetitive transmissions with a dynamic scheduling in any suitable manner.

In particular embodiments, one or more repetitive downlink transmissions may be transmitted by a second base station. The second base station may coordinate with the base station 110. In particular embodiments, the UE 120 may select k antenna states comprising one or more antenna states that are associated with one or more scores indicating channel quality higher than a remainder of the plurality of antenna states for receiving a reference signal from the second base station. The remainder of the plurality of antenna states may comprise the plurality of antenna states excluding the selected antenna states. In particular embodiments, the UE 120 may select k antenna states in any other suitable manner. If i-th downlink repetitive transmission comes from the second base station, the UE 120 may generate a CSI report for antenna state i based on a reference signal from the second base station. The wireless apparatus 120 may receive the i-th repetitive downlink transmission using the antenna state i. As an example and not by way of limitation, the gNB 110 may be coordinated with a second gNB (not illustrated in FIG. 1). Among the k proactive repetitions, the second gNB may transmit the second and the third repetitions. The UE 120 may generate CSI reports for the second antenna states and the third antenna states on receiving reference signals from the second gNB. The UE 120 may send the CSI reports for the second and third antenna states to the second gNB upon uplink transmission opportunities signaled by the gNB 110. When the UE 120 receives the second and third downlink repetitions, the UE 120 may use the second antenna state and the third antenna state, respectively. Although this disclosure describes receiving proactive repetitions from multiple base stations in a particular manner, this disclosure contemplates receiving proactive repetitions from multiple base stations in any suitable manner.

In particular embodiments, the UE 120 may decode data for the downlink transmission based on k sets of received signals after receiving k repetitions for a data unit using k different antenna states. Each of the k set may be received using one of k selected antenna states. Thus, each set of received signals may represent distinctive channel state. Decoding the data unit based on the k sets of received signals may improve the reliability significantly. As an example and not by way of limitation, continuing with a prior example, the UE 120 may have received k downlink repetitions for a data unit from the gNB using k different antenna states. The UE 120 may decode the data unit based on the k sets of received signals. Although this disclosure describes decoding the received data unit using a plurality of sets of received signals in a particular manner, this disclosure contemplates decoding the received data unit using a plurality of sets of received signals in any suitable manner.

In particular embodiments, the UE 120 may proactively retransmit an uplink data for k times. The proactive transmissions may also be applied to uplink transmissions. When the UE 120 sends an uplink data unit to the base station 110. The UE 120 may use the selected k antenna states for transmitting proactively repetitive uplink transmissions. When the UE 120 sends sounding reference signals to the base station 110, the UE 120 may use each of the k selected antenna states so that the base station 110 can obtain corresponding channel state information. The UE 120 may send i-th of the k uplink repetitions using i-th selected antenna state. The uplink transmission opportunities for the sounding reference signals and repetitive uplink transmissions may be scheduled by the base station with a suitable scheduling scheme. Although this disclosure describes transmitting proactive uplink repetitions using k selected antenna states in a particular manner, this disclosure contemplates transmitting proactive uplink repetitions using k selected antenna states in any suitable manner.

Figure 5:
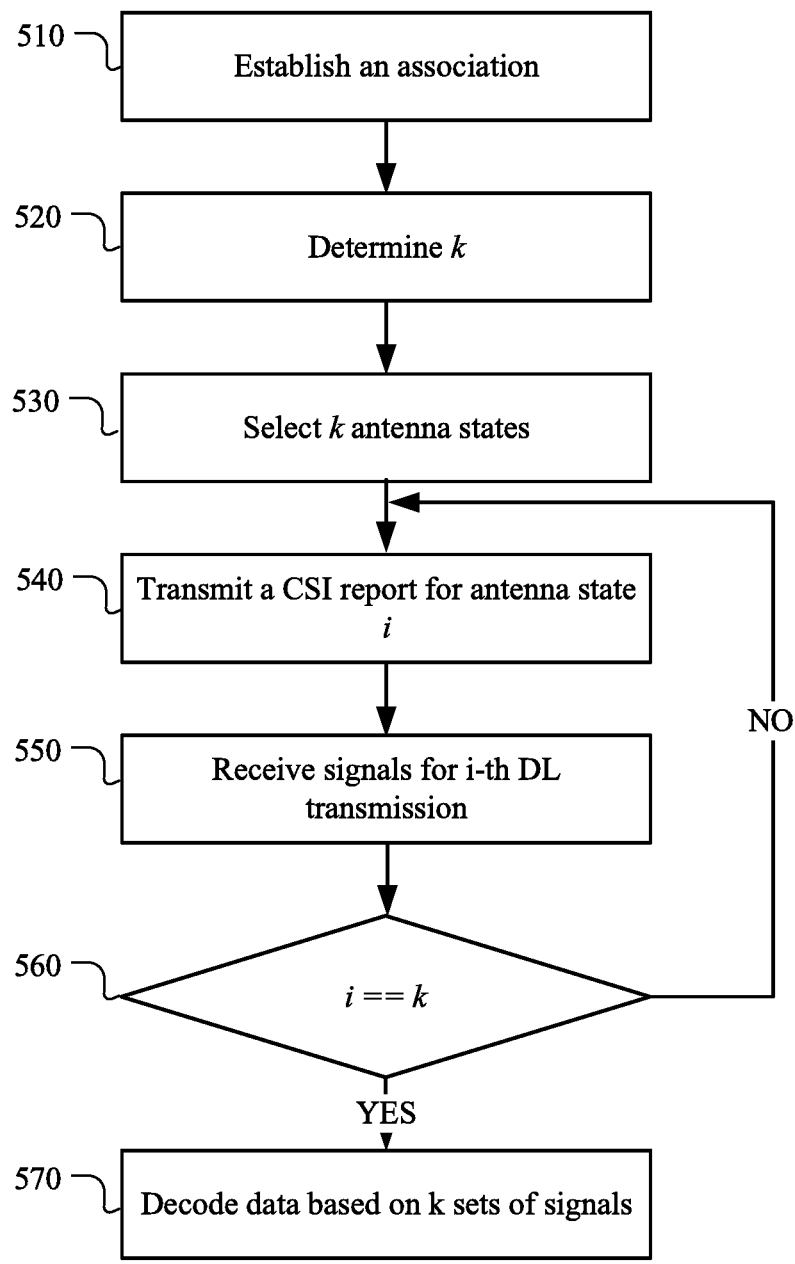
FIG. 5 illustrates an example method for receiving repetitive transmissions with switching between a plurality of antenna states.

FIG. 5 illustrates an example method 500 for receiving repetitive transmissions with switching between a plurality of antenna states. The method may begin at step 510, where a wireless apparatus may establish an association with a base station. At step 520, the wireless apparatus may identify a number of configured proactive repetitions in downlink transmissions from the base station. The number of configured proactive repetitions in downlink transmissions may be k. The wireless apparatus may receive a downlink transmission in one of a plurality of antenna states. At step 530, the wireless apparatus may select k antenna states for receiving repetitive downlink transmissions among the plurality of antenna states. Each of the k antenna states may correspond to each of the repetitive downlink transmissions. At step 540, the wireless apparatus may transmit a CSI report for i of the k antenna states to the base station. A CSI report for an antenna state may be used by the base station to adjust configurations for the corresponding downlink transmission. At step 550, the wireless apparatus may receive signals for i of the k repetitive downlink transmissions from the base station using a corresponding antenna state. At step 560, the wireless apparatus may determine whether i equals to k. At step 570, the wireless apparatus may decode the downlink transmission based on k sets of received signals. Each of the k sets may be received using each of the k selected antenna states. A schedule for the downlink transmission is determined by the base station. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for receiving repetitive transmissions with switching between a plurality of antenna states including the particular steps of the method of FIG. 5, this disclosure contemplates any suitable method for receiving repetitive transmissions with switching between a plurality of antenna states including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
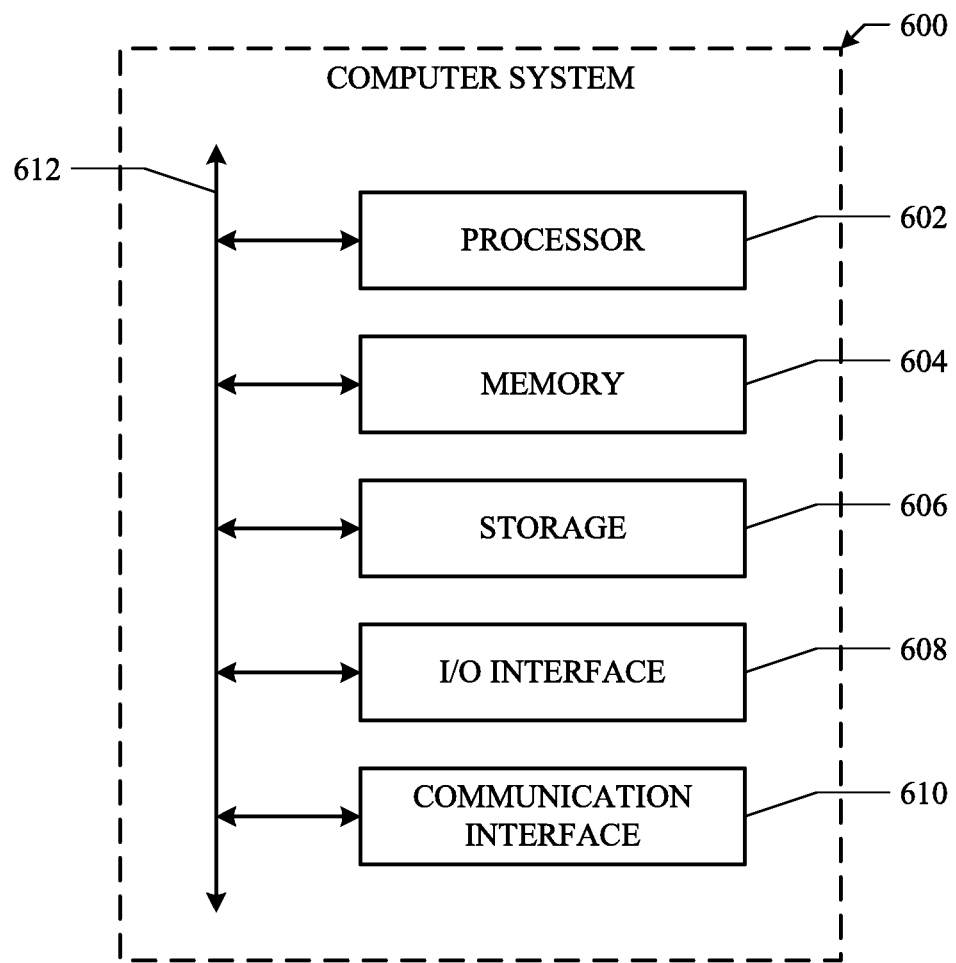
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method by a wireless apparatus associated with a base station, comprising:
    identifying a configured number of proactive repetitive downlink transmissions from the base station corresponding to a data unit, wherein the data unit for each of the proactive repetitive downlink transmissions is identical to each other;
    selecting, among a plurality of available antenna states, k antenna states for receiving k proactive repetitive downlink transmissions corresponding to the data unit, wherein k is the configured number of proactive repetitive downlink transmissions corresponding to the data unit, and wherein each of the k antenna states corresponds to a downlink transmission among the k proactive repetitive downlink transmissions corresponding to the data unit;
    transmitting, for each of the k antenna states, to the base station, a Channel State Information (CSI) report associated with the antenna state, wherein the CSI report is configured to be used by the base station to adjust configurations for the corresponding downlink transmission among the k proactive repetitive downlink transmissions corresponding to the data unit;
    receiving, for each of the k proactive repetitive downlink transmissions corresponding to the data unit, signals using the corresponding antenna state among the k antenna states, wherein a schedule for the k proactive repetitive downlink transmissions corresponding to the data unit is determined by the base station; and
    decoding the k proactive repetitive downlink transmissions to obtain the data unit.

2. The method of claim 1, wherein the base station is a next generation NodeB in a cellular network.

3. The method of claim 1, wherein the base station is configured to make k proactive repetitive transmissions corresponding to the data unit, and wherein the configured number of proactive repetitive downlink transmissions corresponding to the data unit is communicated by the base station.

4. The method of claim 1, wherein the wireless apparatus is associated with an array of antennas, and wherein an antenna state specifies a subset of antennas connected to Radio Frequency (RF) chains among the array of antennas.

5. The method of claim 1, wherein the base station is configured to transmit reference signals.

6. The method of claim 5, wherein a CSI report associated with an antenna state is prepared based on observed parameters while receiving a reference signal with the antenna state.

7. The method of claim 5, wherein the selected k antenna states are associated with first one or more scores higher than second one or more scores associated with the unselected antenna states among the plurality of antenna states, wherein one or more scores associated with an antenna state indicate channel quality for receiving a reference signal using the antenna state.

8. The method of claim 1, wherein one or more of the k proactive repetitive downlink transmissions corresponding to the data unit is sent by a second base station, wherein the second base station is coordinated with the base station.

9. The method of claim 8, wherein the selected k antenna states comprise an antenna state that is associated with first one or more scores higher than second one or more scores associated with the unselected antenna states among the plurality of antenna states, wherein one or more scores associated with an antenna state indicate channel quality for receiving a reference signal using the antenna state from the second base station.

10. The method of claim 1, wherein the k antenna states are selected in a round robin manner among the plurality of available antenna states.

11. The method of claim 1, wherein an uplink transmission opportunity for a CSI report associated with each of the k antenna states and a downlink transmission among the k proactive repetitive downlink transmissions corresponding to the data unit are semi-persistently scheduled by the base station until the schedules are cancelled by the base station.

12. The method of claim 1, wherein an uplink transmission opportunity for a CSI report associated with each of the k antenna states and a downlink transmission among the k proactive repetitive downlink transmissions corresponding to the data unit are dynamically scheduled by the base station, wherein the schedules are communicated by the base station.

13. The method of claim 1, wherein the selected k antenna states are used for transmitting proactively repetitive uplink transmissions corresponding to an uplink data unit by the wireless apparatus.

14. One or more computer-readable non-transitory storage media embodying software that is operable when executed to:
    identify a configured number of proactive repetitive downlink transmissions from the base station corresponding to a data unit, wherein the data unit for each of the proactive repetitive downlink transmissions is identical to each other;
    select, among a plurality of available antenna states, k antenna states for receiving k proactive repetitive downlink transmissions corresponding to the data unit, wherein k is the configured number of proactive repetitive downlink transmissions corresponding to the data unit, and wherein each of the k antenna states corresponds to a downlink transmission among the k proactive repetitive downlink transmissions corresponding to the data unit;

transmit, for each of the k antenna states, to the base station, a Channel State Information (CSI) report associated with the antenna state, wherein the CSI report is configured to be used by the base station to adjust configurations for the corresponding downlink transmission among the k proactive repetitive downlink transmissions corresponding to the data unit;

receive, for each of the k proactive repetitive downlink transmissions corresponding to the data unit, signals using the corresponding antenna state among the k antenna states, wherein a schedule for the k proactive repetitive downlink transmissions corresponding to the data unit is determined by the base station; and decode the k proactive repetitive downlink transmissions to obtain the data unit.

15. The media of claim 14, wherein the base station is a next generation NodeB in a cellular network.

16. The media of claim 14, wherein the base station is configured to make k proactive repetitive transmissions corresponding to the data unit, and wherein the configured number of proactive repetitive downlink transmissions corresponding to the data unit is communicated by the base station.

17. The media of claim 14, wherein the wireless apparatus is associated with an array of antennas, and wherein an antenna state specifies a subset of antennas connected to Radio Frequency (RF) chains among the array of antennas.

18. The media of claim 14, wherein the base station is configured to transmit reference signals.

19. The media of claim 18, wherein a CSI report associated with an antenna state is prepared based on observed parameters while receiving a reference signal with the antenna state.

20. A system comprising: one or more processors; and a non-transitory memory coupled to the processors comprising instructions executable by the processors, the processors operable when executing the instructions to:

identify a configured number of proactive repetitive downlink transmissions from the base station corresponding to a data unit, wherein the data unit for each of the proactive repetitive downlink transmissions is identical to each other;

select, among a plurality of available antenna states, k antenna states for receiving k proactive repetitive downlink transmissions corresponding to the data unit, wherein k is the configured number of proactive repetitive downlink transmissions corresponding to the data unit, and wherein each of the k antenna states corresponds to a downlink transmission among the k proactive repetitive downlink transmissions corresponding to the data unit;

transmit, for each of the k antenna states, to the base station, a Channel State Information (CSI) report associated with the antenna state, wherein the CSI report is configured to be used by the base station to adjust configurations for the corresponding downlink transmission among the k proactive repetitive downlink transmissions corresponding to the data unit;

receive, for each of the k proactive repetitive downlink transmissions corresponding to the data unit, signals using the corresponding antenna state among the k antenna states, wherein a schedule for the k proactive repetitive downlink transmissions corresponding to the data unit is determined by the base station; and decode the k proactive repetitive downlink transmissions to obtain the data unit.

* * * * *